United States Patent [19]
Lim et al.

[11] Patent Number: 5,308,691
[45] Date of Patent: May 3, 1994

[54] CONTROLLED-POROSITY, CALENDERED SPUNBONDED/MELT BLOWN LAMINATES

[75] Inventors: Hyun S. Lim, Chesterfield, Va.; Hyunkook Shin, Wilmington, Del.

[73] Assignee: E. I. du Pont de Nemours and Company, Wilmington, Del.

[21] Appl. No.: 130,773

[22] Filed: Oct. 4, 1993

[51] Int. Cl.$^5$ .............................................. B32B 27/00
[52] U.S. Cl. .................................. 428/286; 156/167; 156/308.2; 428/284; 428/297; 428/298; 428/296; 428/903
[58] Field of Search ............... 428/284, 286, 297, 298, 428/296, 903; 156/296, 308.2, 167

[56] References Cited

U.S. PATENT DOCUMENTS

| | | | |
|---|---|---|---|
| 3,978,185 | 8/1976 | Buntin et al. | 264/93 |
| 4,684,568 | 8/1987 | Lou | 428/265 |
| 4,766,029 | 8/1988 | Brock et al. | 428/286 |
| 4,898,761 | 2/1990 | Dunaway et al. | 428/137 |
| 4,900,619 | 2/1990 | Ostrowski et al. | 428/284 |

Primary Examiner—James J. Bell

[57] ABSTRACT

Controlled porosity composite sheets comprising a melt-blown polypropylene fiber web having a spunbonded polypropylene fiber sheet laminated to at least one side thereof are made by calendering an assembly of the component webs in such a manner that, when a two-layer composite sheet is made, the web of melt-blown fibers is in contact with a metal roll heated to 140°–170° C. operating against an unheated resilient roll; and, when a three-layer composite sheet is made, the spunbonded web in contact with the heated metal roll has a dtex per fiber value of less than 6.

These composite sheets have a Gurley-Hill porosity of about 5–75 seconds, excellent mechanical and tear strengths, high water vapor penetration rate, and low liquid water permeability. They are particularly suitable for making housewrap sheets and sheets for sterile packaging. In the sterile packaging field, they are significantly better than medical paper used for the same purpose.

13 Claims, 1 Drawing Sheet

CONTROLLED-POROSITY, CALENDERED SPUNBONDED/MELT BLOWN LAMINATES

BACKGROUND OF THE INVENTION

This invention relates to calendered laminates of spunbonded and melt-blown polypropylene webs which combine high opacity with low air and water permeability but good moisture vapor transmission, and good barrier properties against bacteria.

Spunbonded polyethylene sheet (prepared from flash-spun polyethylene plexifilamentary web) has been used for some years as an air flow resistant "housewrap", as well as in sterile packaging applications. The sheet is known for its strength, durability, opacity and ability to reduce air penetration, yet maintains a high moisture vapor transmission rate and, in addition, provides excellent barrier to bacteria. However, there exists a need for a housewrap product with higher tear resistance, especially in areas exposed to strong winds. At the same time, there is a need in sterile packaging for a higher melting material, capable of withstanding steam sterilization. One polyolefin material that has sufficiently high melting temperature and excellent mechanical properties is polypropylene.

Use of polypropylene housewrap sheets is known. Thus, U.S. Pat. No. 4,898,761 to Dunaway et al. (Reemay Inc.) discloses a barrier housewrap fabric impermeable to liquid and permeable to water vapor, which is made by laminating an impermeable polymer film to a polypropylene sheet available, i.a., from E.I. du Pont de Nemours and Company under the trademark TYPAR ® and needling the resultant sheet with fine diameter needles to make the sheet porous. U.S. Pat. No. 4,684,568 to Lou (DuPont) describes a water vapor-permeable, liquid water-impenueable fabric made by applying a coating of polypropylene film to a TYPAR ® sheet and then calendering. Although these products have adequate tear resistance and strength, they do not have a good balance of air penetration resistance and moisture-vapor transmission rate.

U.S. Pat. No. 4,766,029 to Brock et al. (Kimberley-Clark Corp.) discloses a housewrap which is a calendered, three-layer laminate of spunbonded/melt-blown/spunbonded webs. The melt-blown layer has two components, namely, polyethylene and polypropylene microfibers. During lamination, polyethylene fibers melt and the material flows, to close up the interstitial space and to bond the layers together. This creates a semi-permeable laminate. The requirement of two types of fibers in the melt-blown material is on obvious disadvantage.

U.S. Pat. No. 4,900,619 to Ostrowski et al. (James River Corp.) describes a translucent nonwoven composite of thermoplastic melt-blown and spunbonded webs laminated together by hot-calendering in a nip made by a smooth, heated steel roll and a resilient roll heated with an external, infrared source, each roll being at a temperature of about 116°-160° C. Typically, the thermoplastic material in each layer is polypropylene.

The term "translucent" is understood to mean "permitting the passage of light". The degree of translucency can be determined, e.g., by an opacity measurement (TAPPI test method T 425 om-86, "Opacity of Paper"). By that test, the commercial James River product has an opacity of less than 50%. It is possible that this low opacity results from laminating the sheets between two heated calender rolls, forming a film. Usually, translucency indicates the occurrence of permanent changes of certain physical properties of the fibers or of their distribution in the sheet, which could lead to lower mechanical integrity or tensile strength. Further, it is preferred, for aesthetic reasons, to have a housewrap that is opaque, rather than translucent. Even though the housewrap eventually is covered by a siding, a house under construction covered with a housewrap through which all the studs and joints can be seen appears unsightly.

International Application WO 87/05952 of Kimberley-Clark discloses impregnation of spunbonded filaments with a fluorocarbon prior to calendering. The product is a spunbonded/melt-blown/spunbonded nonwoven laminate for disposable garments. The purpose of calendering is to improve the resistance of the laminated garment's surface to "fuzzing and linting", while maintaining porosity, softness and drape. Without fluorocarbon impregnation, garments lose their porosity during calendering. The calender comprises a smooth steel roll heated to the melting temperature of the fibers in the layer in contact therewith (e.g., 167° C. for polypropylene) and an unheated roll which can be made of such materials as plastic, cotton, or paper.

There is a need for a strong, opaque web with good water vapor penetration rate, low air permeability, no liquid water permeability, and good barrier properties against bacteria.

SUMMARY OF THE INVENTION

According to the present invention, there is now provided a high-strength, tear-resistant, calendered, composite sheet having an opacity, as determined by TAPPI test T-519 om-86, of at least 75%, low air permeability expressed as Gurley-Hill porosity of 5-75 seconds, high water vapor transmission rate of at least 500 g/m² in 24 hours according to ASTM standard E96, method B, low liquid water permeability expressed by a hydrostatic head pressure of at least 0.75 m according to AATCC standard 127-1985, and barrier properties against bacteria that are significantly better than those of medical paper used for sterile packaging, which sheet comprises one melt-blown polypropylene fiber web and a spunbonded polypropylene fiber sheet laminated to at least one side thereof, the melt-blown fibers having an average diameter of 1–10 mm, the melt-blown fiber web itself having an average weight of about 17–40.7 g/m², and the fibers of the spunbonded sheet having an average diameter of at least 20 mm, the spunbonded sheet itself having an average weight of about 17–100 g/m².

There also is provided a process for forming the above composite sheet by calendering an assembly consisting of a melt-blown polypropylene web and at least one spunbonded sheet in a calender comprising a smooth metal roll heated to a temperature of 140°-170° C., operating against an unheated, resilient roll, at a nip loading of about $1.75 \times 10^{-5} - 3.5 \times 10^{-5}$ N/m;

with the proviso that when forming a two-layer composite sheet, only the melt-blown fiber web is in direct contact with the heated metal roll; and when forming a three-layer composite sheet, the spunbonded sheet in contact with the heated metal roll is made of filaments having a dtex-per-filament (DTPF) value of less than 6.

DETAILED DESCRIPTION OF THE INVENTION

Figure 1:
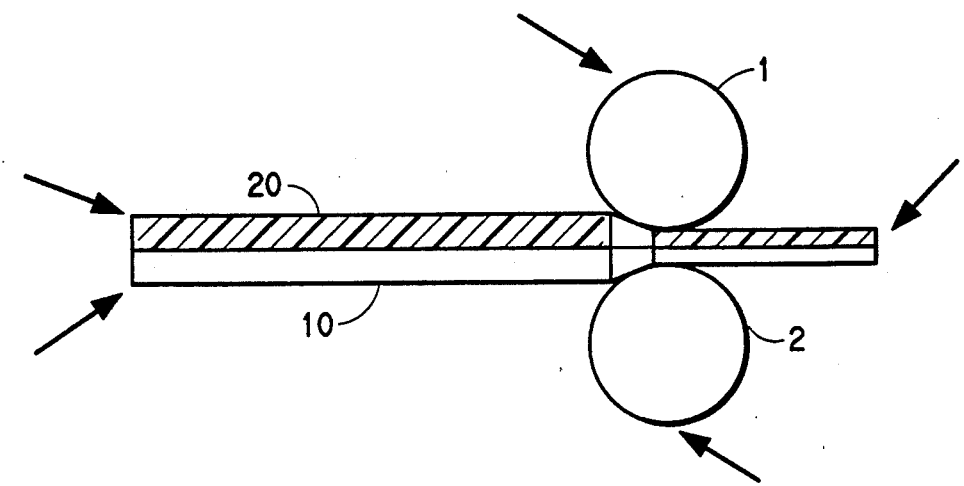
FIG. 1 is a schematic drawing representing the process of calendering a two-layer composite sheet.

Both melt-blown polypropylene fiber and spunbonded polypropylene fiber are well known and commercially available. Melt-blown polypropylene fibers can be made by extruding the polymeric material into fine streams and stretching those streams into fibers of small diameter by exposure to high velocity heated air, as described in U.S. Pat. No. 3,978,185 (to Buntin et al.). Those fibers, with an average diameter of about 1–10 μm, are collected in the form of a web on a moving belt. The web may be either electrostatically charged or uncharged. The charging process is described in U.S. Pat. No. 4,904,174 (to Moosmayer et al. ) Polypropylene suitable for making melt-blown fibers has a rather high melt flow rate of about 200–800 dg/min.

Spunbonded polypropylene fibers can be made by any convenient process, for example, by melt-spinning the polymer in a generally known manner, e.g., as described in U.S. Pat. Nos. 3,821,062 to Henderson; 3,563,838 to Edwards; and 3,338,992 to Kinney. The spunbonded fibers are long and have an average diameter of at least 20 μm. When forming a two-layer composite, it is preferred to employ a spunbonded sheet in which the fibers have a DTPF value of about 10 or more. The polypropylene resin used for making this spunbonded filament have a melt flow rate of about 3.5–4.6 dg/min. The resin used for manufacturing TYPAR ® has a melt flow rate of 4.2 dg/min, and the fibers have a DTPF of greater than 9.

The spunbonded layer in the composites of the present invention provides mechanical strength and integrity, while the melt-blown layer provides the desired microporosity and barrier properties. The composites of the present invention can be either simple laminates consisting of one layer of melt-blown web laminated to one layer of spunbonded web or can be in the form of a three-layer sandwich, in which the melt-blown web forms the core, while the spunbonded web forms the outer layers.

Calendering reduces the web's porosity and imparts to it its desirable barrier properties. This operation can be carried out in a standard apparatus comprising a heated metal, ususally steel, roll and an unheated resilient roll, which can be made of any suitable material, such as, e.g., densely packed cotton, wool, or polyamide. Typical Shore D hardness of the resilient material can be about 75–85. The hardness of the unheated resilient roll determines the "footprint", i.e., the instant area being calendered. If the hardness is reduced, contact area is increased and the pressure decreases; if the hardness is increased, the contact area is decreased and the pressure increases. A balance of pressure and temperature is sought to produce the desired calendering conditions for controlling the porosity of the resulting composite sheet. Calendering with only one heated roll increases opacity. By contrast, when both rolls are heated, the resulting sheet is translucent and more film- or paper-like, which is undesirable. Translucent, paper-like sheet often exhibits lower tensile strength but also especially lower tear strength This can be attributed to a significantly decreased contribution of individual fibers and significant loss of fiber orientation.

The preferred heated roll temperature according to the present invention is 140°–155° C. The degree of porosity of the web depends, among others, on nip loading, which is the ratio of force applied to the sheet in the nip of the calender to the width of the sheet; the higher the nip loading the lower the porosity. Preferably, the nip loading should be about $1.75-3.50 \times 10^{-5}$ N/m.

When forming a two-layer composite, the melt-blown polypropylene fiber web directly contacts the heated metal roll. This permits operation at a temperature lower than the melting point of polypropylene, although any temperature up to about 170° C. can be used in principle.

When forming a three-layer composite, it is critical to the success of this process to use a low DTPF spunbonded sheet on the side in direct contact with the heated metal roll. This permits good heat transfer to and through the melt-blown web and results in good bonding of all three layers. The spunbonded sheet in contact with the unheated resilient roll usually will also be a low DTPF material.

In either case, whether making a two-layer composite or a three-layer composite, the adhesion of the spunbonded sheet not in contact with the heated metal roll can be further improved be preheating the sheet before the calendering step, for example, by contacting it with another metal roll heated to a temperature of about 20° C. below the operating temperature of the metal calender roll.

FIG. 1 schematically illustrates the process of the present invention for making a two-layer composite, wherein 10 is the spunbonded sheet component, and 20 is the melt-blown web component; 1 is the heated metal roll, and 2 is the unheated resilient roll. The arrows show the direction of movement of the components and of the composite as well as the direction of rotation of the rolls.

Figure 2:
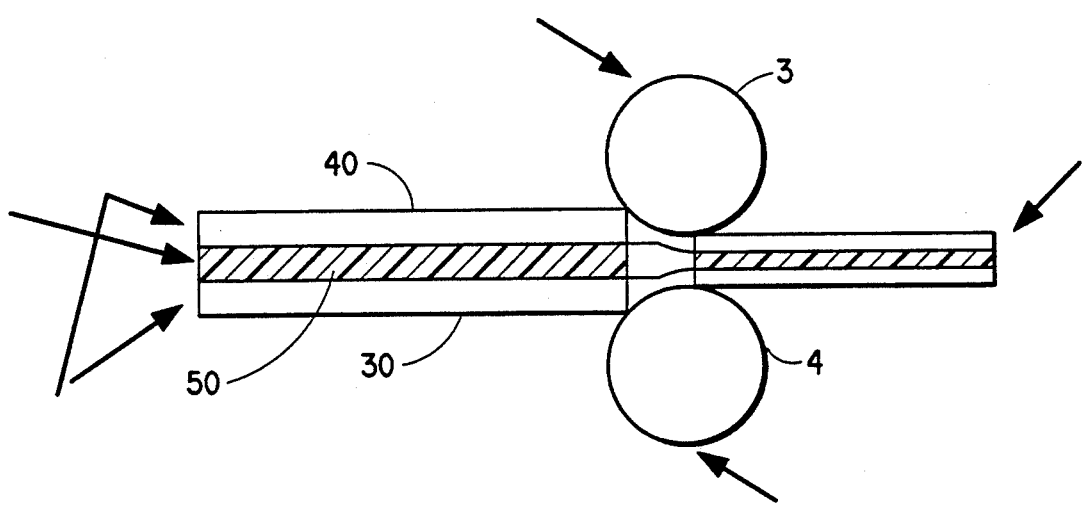
FIG. 2 is a schematic drawing representing the process of calendering a three-layer composite sheet.

FIG. 2 schematically illustrates the process of the present invention for making a three-layer composite, wherein 30 and 40 are the spunbonded sheet components, and 50 is the melt-blown web component; 3 is the heated metal roll, and 4 is the unheated resilient roll. The arrows show the direction of movement of the components and of the composite as well as the direction of rotation of the rolls.

For use as a housewrap, the composite should have under standard temperature and pressure conditions a Gurley-Hill porosity of 30–75 seconds. Its water vapor transmission rate desirably should be at least 500 g/m$^2$ in 24 hours or more. Liquid water permeability should be low. This property is normally evaluated by measuring the hydrostatic head pressure under standard conditions. Preferably, the hydrostatic head pressure should be at least 0.9 m. The tensile strength should be at least 3000N per meter of width.

For use in sterile packaging, the Gurley-Hill porosity of the composite sheet should be 5–50 seconds. The composite sheet desirably should under standardized test conditions (to be described below) provide an effective barrier such that at least 60% of the test samples show no bacteria present. The tensile strength should be at least 1000N per meter of width.

Materials with a Gurley-Hill porosity of about 5–75 seconds have sometimes been used in the past for microfiltration of liquids. See, for example Lim et al., *TYVEK for Microfiltration Media,* Fluid/Particle Separation Journal, Vol. 2, No. 1, March, 1989. Microfiltration elements can also be made from the composite sheets of the present invention.

This invention is now illustrated by the following examples of certain representative embodiments thereof. All units of weight and measure not originally obtained in SI units have been converted to SI units. Some of those figures have been rounded off.

TESTING

Those tests carried out according to ASTM standards are identified by their ASTM number. Other tests are identified according to their literature references given below, with any additional explanations given as appropriate.

Tensile strength—ASTM D1682-64
Elongation—ASTM D1682-64.
Elmendorf tear strength ASTM D 1423-83
Frazier porosity—ASTM D737-75
Water vapor transmission rate—ASTM E96, method B Gurley-Hill porosity—TAPPI[1] T-460 om-86. This test measures the time required for 100 cm$^3$ of air to pass through a sample under standard conditions.

[1]Technical Association of the Pulp and Paper Industry

Hydrostatic head—AATCC[2] Test Method 127-1985. The specimen is mounted under the orifice of a conical well and subjected to a steadily increasing water pressure, until three points of leakage appear on its undersurface.

[2]American Association of Textile Chemists and Colorists

Opacity—TAPPI T-519 om-86. The test reports the percentage of printed matter that is obscured by a single sheet of the test material.

Bacteria barrier property—A bacterial test chamber (BTC), designed to hold several samples, has been devised by the DuPont Compay. A cloud of bacteria spores generated by a nebulizer is delivered to a closed BTC containing the test samples. All samples are subjected to vacuum simultaneously. The bacteria spores either do or do not pass through the samples. Bacteria spores which pass through the samples are collected on membrane filters. All membrane filters are removed and incubated to determine their bacteria population. The results are reported as percent of the samples resisting bacteria penetration. This test is described in Proceedings of the Tenth Technical Symposium of INDA (Association of the Nonwoven Fabrics Industry), Nov. 17-19, 1992, New York, N.Y., S. K. Rudys, "Spunbonded Olefin in Medical Packaging".

In all the experiments, fibers of the spunbonded sheets had a diameter of 20 μm, and the fibers of the melt-blown webs had an average diameter of 1-10 μm.

EXAMPLE 1

Two-Layer Composite For Housewrap Application

The spunbonded polypropylene sheet was DUPONT's TYPAR®.

The melt-blown web used in this Example was made by extruding molten polypropylene through a spinneret and fibrillating the extruded fibers at the spinneret with high temperature and high velocity air streams to form microfibers. The melt-blown fibers were formed into a sheet on a moving belt equipped with a suction box. The melt-blowing technology is being licensed for commercial use by Exxon Chemical Co.

The spunbonded polypropylene sheet and the melt-blown web were laminated by calendering in the nip formed between a smooth metal roll and a polyamide roll, which had a Shore D hardness of 78. The metal roll was heated to a surface temperature of 154° C. The polyamide roll was not heated. A load of 2.75×10$^{-5}$N/m was applied to the sheet/web assembly as it advanced through the calender nip at a speed of 20 m per minute. The melt-blown web contacted the steel heated roll while the spunbonded sheet contacted the polyamide roll. Under these conditions, excellent adhesion between the spunbonded sheet and the melt-blown web was obtained. The resulting composite sheet exhibited high air flow resistance and high water vapor transmission rate properties. In addition, high tensile and tear strengths also were demonstrated. The physical properties of both starting webs as well as of the laminated composite sheet are given below in Table 1.

TABLE 1

|  | TYPAR ® | Melt-blown | Composite |
|---|---|---|---|
| Sheet weight, g/m$^2$ | 67.8 | 40.7 | 108.5 |
| Frazier porosity (m$^3$/min × m$^2$) | 92.4 | 9.8 | <<0.15 |
| Gurley-Hill porosity (seconds) | <<1 | <<1 | 30 |
| MD/CD* Tensile strength (N/m × 10$^{-3}$) | 3.68/2.80 | 0.42/0.38 | 4.03/2.98 |
| MD/CD* Elong. (%) | 35/42 | 17.33 | 35/44 |
| MD/CD* Elmendorf tear strength (N) | 11/13 | 0.5/0.5 | 14/12 |
| Hydrostatic head (m) | ca.0 | 0.58 | 0.86 |
| Opacity (%) | 31 | 76 | 84 |
| Water vapor transm. rate (g/m$^2$ × 24 hr.) | — | — | 686 |

*MD = machine direction; CD = cross direction

By contrast, when a composite sheet was made with the same spunbonded sheet contacting the heated roll and the melt-blown web contacting the polyamide roll, the lamination required a much higher operating temperature of 188° C. Further, adhesion of the melt-blown layer to the spunbonded layer was not as good, and the composite sheet exhibited low air flow resistance, as shown in Table 2.

TABLE 2

| Heated roll temp., °C. | Speed, m/min | Nip loading, N/m × 10$^{-5}$ | Gurley-Hill porosity, sec. | Web in contact with heated roll |
|---|---|---|---|---|
| 188 | 20 | 3.00 | 1.5 | Spunbonded |
| 155 | 20 | 3.00 | 42.6 | Melt-blown |

EXAMPLE 2

Two-Layer Composite, Variable Calendering Conditions

This example illustrates the range of air permeabilities that can be obtained by varying the nip loading and speed, at a constant temperature of 155° C. The spunbonded sheet was TYPAR ® having a basis weight of 68 g/m$^2$, while the melt-blown polypropylene web had a basis weight of 38 g/m$^2$. The experimental conditions and results are presented in Table 3, below.

TABLE 3

| Speed, m/min | Nip pressure, N/m × 10$^{-5}$ | Gurley-Hill porosity, sec. |
|---|---|---|
| 20 | 3.00 | 42.6 |
| 20 | 2.25 | 33.3 |
| 40 | 3.00 | 41.0 |
| 40 | 2.25 | 34.7 |
| 60 | 3.00 | 16.7 |
| 60 | 2.25 | 10.6 |
| 80 | 3.00 | 14.7 |
| 80 | 2.25 | 7.8 |

As can be seen, a wide range of permeabilities can be obtained by varying the calendering conditions. The permeability decreases, as evidenced by increasing Gurley-Hill porosity, with decreasing calendering speed and increasing nip loading. This suggests that longer residence time and higher consolidation force at the calender nip result in a better heat transfer through the melt-blown web, giving it characteristics similar to those of a membrane.

EXAMPLE 3

Three-Layer Composite Sheet For Sterile Packaging Applications.

In this example, the composite had a core of melt-blown polypropylene fiber web and outer layers of spunbonded polypropylene sheets, where the spunbonded sheets were not TYPAR ® but were made with filaments having a DTPF value of less than 6. The composite sheet formed a good barrier to bacteria and could be sterilized with steam.

The spunbonded web was made by extruding molten polypropylene through multiple spinneret orifices. The resulting filaments were quenched with controlled temperature air and suction fed through a venturi jet to a distribution chamber to ensure the fanning and entangling of the filaments. The entangled filaments were deposited as a random web on a moving belt, which had a suction box under it.

The melt-blown web used in this Example was prepared as in Example 1.

The two spunbonded outer layers and the melt-blown inner layer were laminated in the nip of a calender between a smooth metal roll and a cotton-filled roll having a Shore D hardness of 80–83. The metal roll was heated to a surface temperature of 149° C., while the cotton-filled roll was unheated. A load of $1.75 \times 10^{-5}$ N/m was applied to the sheet as the sheet advanced through the calender nip at a speed of 59.4 m/min.

The physical properties of the individual components as well as of the composite sheet are given in Table 4. It can be seen that air permeability of the composite was significantly lower, with higher hydrostatic head, than that of either the melt-blown web or the spunbonded sheet. A superior bacteria barrier property, with high hydrostatic head, also was achieved. By comparison, medical packaging paper with a basis weight of 67.8 g/m², which is used extensively in sterile medical packaging, exhibits under the same test conditions a zero bacteria barrier property.

TABLE 4

|  | Spunbonded | Melt-blown | Composite |
|---|---|---|---|
| Basis wt (g/m²) | 17 | 40.7 | 81.4 |
| Frazier porosity (m³/min × m²) | >219 | 9.08 | <<0.15 |
| Gurley-Hill porosity (s) | <<0.5 | <<0.5 | 41.5 |
| MD/CD* Tensile str. (N/m × 10⁻³) | 0.38/0.28 | 0.40/0.28 | 1.70/0.56 |
| MD/CD* Elongation (%) | 43.5/59.7 | 22.3/37.6 | 11.1/4.5 |
| MD/CD* Elmendorf tear strength (N) | 2.5/2.7 | 0.5/0.5 | 4.4/4.9 |
| Hydrostatic head (m) | 0.09 | 0.43 | 1.24 |
| Opacity (%) | 30.4 | 84 | 81 |
| BTC test (%) | 0 | 0 | 66.7 |

*MD = machine direction; CD = cross direction

EXAMPLE 4

Additional Composites For Sterile Packaging

This example illustrates the range of permeability and bacteria barrier properties that can be achieved by use of the process of the present invention. In one series of runs, the nip loading was varied, while the calendering temperature was held constant at 143° C., and calendering speed was held constant at 59.4 m/min. In another series of runs, the calendering temperature was varied, while the nip loading was held constant at $1.75 \times 10^{-5}$ N/m, and the calendering speed was held constant at 59.4 m/min. The physical properties of the composite sheets from these two series of runs are shown, respectively, in Tables 5 and 6, below.

TABLE 5

| Nip Loading (N/m × 10⁻⁵) | Gurley-Hill porosity (sec) | Hydrostatic head (m) |
|---|---|---|
| 1.75 | 19.9 | 1.16 |
| 2.26 | 43.0 | 1.36 |
| 3.50 | 70.1 | 1.38 |

TABLE 6

| Temperature (°C.) | Gurley-Hill porosity (sec.) | Hydrostatic head (m) | Composite BTC (%) | Medical paper* BTC (%) |
|---|---|---|---|---|
| 143 | 19.9 | 1.16 | 41.7 | 0 |
| 149 | 41.5 | 1.24 | 66.7 | 0 |
| 154 | 13.1 | 1.03 | 41.7 | 0 |

*Paper used for sterile packaging ("Monadnock") 67.8 g/m²

The above data show that, at constant temperature, Gurley-Hill porosity and hydrostatic head increase with nip loading, indicating that the structure of the composite sheet becomes tighter. At constant nip loading and calendering speed, both Gurley-Hill porosity and hydrostatic head exhibited a maximum at 149° C. The BTC barrier property also reached a maximum at that temperature.

EXAMPLE 5

Three-Layer Composite, With Electrostatically Charged Melt-Blown Web

This example illustrates a further improvement in the bacteria barrier property when an electrostatically charged melt-blown web is used as the inner layer of a three-layer composite of this invention. The melt-blown fibers are electrostatically charged in the web-forming step, e.g., as described in U.S. Pat. Nos. 4,215,682 to Kubik et. al. (3M Company) and 4,904,174 to Mossmeyer (Exxon Company and Battelle Institute). The composite was made substantially as described in Example 3. The results are shown in Table 7, below.

TABLE 7

| Electrostatic charging | Gurley-Hill porosity (sec). | Hydrostatic Head (m) | BTC (%) |
|---|---|---|---|
| No | 41.5 | 1.24 | 66.7 |
| Yes | 47.2 | 1.10 | 83.0 |

It is noted that, while the porosities and hydrostatic heads were not much affected by electrostatic charging of the melt-blown web, the bacteria barrier property was changed dramatically.

We claim:

1. A high-strength, tear-resistant, calendered, composite sheet having an opacity, as determined by TAPPI test T-519 om-86, of at least 75%, having low air permeability expressed as Gurley-Hill porosity of 5-75 seconds, high water vapor transmission rate of at least 500 g/m² in 24 hours according to ASTM standard E96, method B, low liquid water permeability expressed by a hydrostatic head pressure of at least 0.75 m according to AATCC standard 127-1985, and barrier properties against bacteria that are significantly better than those of medical paper used for sterile packaging, which sheet comprises one melt-blown polypropylene fiber web and a spunbonded polypropylene fiber sheet laminated to at least one side thereof, the melt-blown fibers having an average diameter of 1-10 μm, the melt-blown fiber web itself having an average weight of about 17-40.7 g/m², and the fibers of the spunbonded sheet having an average diameter of at least 20 μm, the spunbonded sheet itself having an average weight of about 17-100 g/m².

2. A composite sheet of claim 1 for use as a housewrap, which has a Gurley-Hill porosity 30-75 seconds.

3. A composite sheet of claim 2 which has a water vapor transmission rate according to ASTM E96, method B of at least 500 g/m² in 24 hours and a liquid water permeability expressed as hydrostatic head pressure of at least 0.9 m.

4. A composite sheet of claim 1 for use in sterile packaging, which has a Gurley-Hill porosity of 5-50 seconds, which under standardized bacterial test chamber conditions provides an effective barrier to bacteria such that at least 60% of test samples show no bacteria present.

5. A composite sheet of claim 1 wherein the melt-blown web is electrostatically charged.

6. A composite sheet of claim 4 wherein the melt-blown web is electrostatically charged.

7. A two-layer composite sheet of claim 1 wherein the fibers of the spunbonded sheet have a dtex per filament value of at least 10.

8. A three-layer composite sheet of claim 1 wherein at least one of the spunbonded layers is made of fibers of less than 6 dtex per filament.

9. A microfiltration element made of a composite sheet of claim 1.

10. A process for forming a composite sheet by calendering an assembly consisting of a melt-blown polypropylene fiber web and a spunbonded polypropylene fiber sheet laminated to at least one side thereof, the melt-blown fibers having an average diameter of 1-10 μm, the melt-blown fiber web itself having an average weight of about 17-40.7 g/m², and the fibers of the spunbonded sheet having an average diameter of at least 20 μm, the spunbonded sheet itself having an average weight of about 17-100 g/m², in a calender comprising a smooth metal roll heated to a temperature of 140°-170° C., operating against an unheated, resilient roll having a Shore D hardness of 75-85, at a nip loading of about $1.75 \times 10^{-5} - 3.5 \times 10^{-5}$ N/m;

with the proviso that when forming a two-layer composite sheet, only the melt-blown fiber web is in direct contact with the heated metal roll; and when forming a three-layer composite sheet, the spunbonded sheet in contact with the heated metal roll is made of filaments having a dtex-per-filament (DTPF) value of less than 6.

11. A process of claim 7 wherein a two-layer composite sheet is made, and the melt-blown fibers of the web in contact with the heated metal roll have a dtex per fiber value of at least about 10.

12. A process of claim 7 wherein the temperature of the heated metal roll is 140°-150° C.

13. A process of claim 7 wherein the layer in contact with the heated metal roll is preheated, prior to such contact, to a temperature of about 20° C. below the temperature of the heated metal roll.

* * * * *